US012231962B2

(12) United States Patent
Polaganga et al.

(10) Patent No.: US 12,231,962 B2
(45) Date of Patent: Feb. 18, 2025

(54) OPTIMIZING LAYER ASSIGNMENT BASED ON QCI (71) Applicant: T-Mobile Innovations LLC, Overland Park, KS (US)

(72) Inventors: Roopesh Kumar Polaganga, Bothell, WA (US); Sreekar Marupaduga, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 501 days.

(21) Appl. No.: 17/563,720

(22) Filed: Dec. 28, 2021

(65) Prior Publication Data

US 2023/0209410 A1 Jun. 29, 2023

(51) Int. Cl.
*H04W 28/24* (2009.01)
*H04W 28/02* (2009.01)
*H04W 72/54* (2023.01)

(52) U.S. Cl.
CPC ....... *H04W 28/24* (2013.01); *H04W 28/0268* (2013.01); *H04W 72/54* (2023.01)

(58) Field of Classification Search
CPC .. H04W 28/24; H04W 28/0268; H04W 72/54
See application file for complete search history.

(56) References Cited

U.S. PATENT DOCUMENTS

| | | | | |
|---|---|---|---|---|
| 9,001,784 | B2* | 4/2015 | Ramachandran ... | H04W 36/144 370/331 |
| 9,838,912 | B1* | 12/2017 | Pawar ............... | H04W 36/0022 |
| 9,866,343 | B1* | 1/2018 | Sung ................ | H04L 27/26 |
| 10,512,064 | B1* | 12/2019 | Singh ............... | H04W 72/21 |
| 10,575,207 | B2* | 2/2020 | Chong .............. | H04L 12/1482 |
| 10,791,450 | B1* | 9/2020 | Bakker ............. | H04W 4/90 |
| 11,102,625 | B2* | 8/2021 | Kim ................. | H04W 48/16 |
| 11,277,780 | B2* | 3/2022 | Chong .............. | H04W 36/26 |
| 11,576,087 | B2* | 2/2023 | Tang ................ | H04W 36/00222 |
| 11,700,290 | B1* | 7/2023 | Chiang ............. | H04L 65/1016 709/227 |
| 11,832,229 | B2* | 11/2023 | Kim ................. | H04L 5/0094 |
| 2013/0107863 | A1* | 5/2013 | Faccin .............. | H04W 36/249 370/331 |
| 2013/0265884 | A1* | 10/2013 | Brombal ........... | H04W 76/22 370/242 |
| 2013/0303114 | A1* | 11/2013 | Ahmad ............. | H04L 12/1407 455/406 |
| 2014/0064156 | A1* | 3/2014 | Paladugu .......... | H04W 28/0268 370/259 |

(Continued)

*Primary Examiner* — Melanie Jagannathan (74) *Attorney, Agent, or Firm* — SHOOK, HARDY & BACON L.L.P.; Elena K. McFarland (57) ABSTRACT Systems and methods are provided for optimizing layer assignment based on a total QCI value associated with a UE when the UE falls back from a first wireless access technology to a second wireless access technology, such as from 5G to LTE. QCI values and/or one or more applications running on a UE are monitored to determined when a threshold is met. The UE may receive or initiate a voice call, and at this point, the UE may fallback to LTE from 5G. The network may determine that the UE should fallback to an LTE layer having the highest bandwidth to support the high total QCI value and the high number of applications running on the UE.

18 Claims, 5 Drawing Sheets

(56) References Cited

U.S. PATENT DOCUMENTS

| | | | |
|---|---|---|---|
| 2014/0213258 A1* | 7/2014 | Dahlen | H04W 8/22 455/436 |
| 2014/0228017 A1* | 8/2014 | Chang | H04W 24/10 455/422.1 |
| 2015/0019746 A1* | 1/2015 | Shatzkamer | H04W 76/10 709/228 |
| 2015/0023188 A1* | 1/2015 | Das | G01R 31/319 370/252 |
| 2015/0085829 A1* | 3/2015 | Bawaskar | H04W 36/302 370/332 |
| 2015/0105094 A1* | 4/2015 | Kotecha | H04L 47/29 455/452.2 |
| 2015/0295835 A1* | 10/2015 | Yang | H04L 47/18 370/235 |
| 2015/0326447 A1* | 11/2015 | Yoon | H04L 41/5025 709/224 |
| 2015/0382267 A1* | 12/2015 | Wang | H04W 36/22 455/436 |
| 2016/0007240 A1* | 1/2016 | Belghoul | H04W 36/14 370/331 |
| 2016/0066234 A1* | 3/2016 | Cho | H04W 36/302 370/331 |
| 2016/0119813 A1* | 4/2016 | Sridhar | H04W 28/0967 370/229 |
| 2016/0142931 A1* | 5/2016 | Mondal | H04L 41/0631 370/252 |
| 2016/0150566 A1* | 5/2016 | Lee | H04W 74/085 370/329 |
| 2016/0219480 A1* | 7/2016 | Roeland | H04W 36/22 |
| 2017/0019819 A1* | 1/2017 | Yang | H04W 36/14 |
| 2017/0099600 A1* | 4/2017 | Jeong | H04W 36/0038 |
| 2018/0027439 A1* | 1/2018 | Wu | H04W 24/10 370/328 |
| 2018/0184307 A1* | 6/2018 | Periyasamy | H04M 15/61 |
| 2018/0220330 A1* | 8/2018 | Van Der Velde | H04W 28/0284 |
| 2019/0274076 A1* | 9/2019 | Kim | H04W 36/30 |
| 2019/0281647 A1* | 9/2019 | Chiang | H04L 65/1016 |
| 2019/0281648 A1* | 9/2019 | Liu | H04W 48/20 |
| 2020/0053133 A1* | 2/2020 | Atarius | H04L 69/164 |
| 2020/0221369 A1* | 7/2020 | Adjakple | H04W 48/18 |
| 2020/0314702 A1* | 10/2020 | Rahman | H04W 36/0069 |
| 2020/0323008 A1* | 10/2020 | Pal | H04W 8/02 |
| 2021/0007030 A1* | 1/2021 | Huang | H04W 36/00226 |
| 2021/0021646 A1* | 1/2021 | Chiang | H04W 28/0236 |
| 2021/0022024 A1* | 1/2021 | Yao | H04W 36/0085 |
| 2021/0022197 A1* | 1/2021 | Chiang | H04W 28/22 |
| 2021/0051530 A1* | 2/2021 | Venkataraman | H04W 48/18 |
| 2021/0099925 A1* | 4/2021 | Keller | H04W 76/27 |
| 2021/0105847 A1* | 4/2021 | Prabhakar | H04L 43/0829 |
| 2021/0112550 A1* | 4/2021 | Lekutai | H04W 72/541 |
| 2021/0136634 A1* | 5/2021 | Bakker | H04L 65/1016 |
| 2021/0160720 A1* | 5/2021 | Chiang | H04B 17/318 |
| 2021/0377817 A1* | 12/2021 | Lu | H04L 65/1069 |
| 2022/0015001 A1* | 1/2022 | Parichehrehteroujeni | H04W 36/32 |
| 2022/0078690 A1* | 3/2022 | Rahman | H04W 36/0022 |
| 2022/0095184 A1* | 3/2022 | Patil | H04W 8/04 |
| 2022/0141719 A1* | 5/2022 | Shan | H04W 36/0022 370/331 |
| 2022/0167244 A1* | 5/2022 | Zaus | H04L 69/24 |
| 2022/0248278 A1* | 8/2022 | Huang | H04W 8/183 |
| 2022/0295360 A1* | 9/2022 | Nagarajan | H04W 36/0083 |
| 2022/0417798 A1* | 12/2022 | Chinthalapudi | H04W 28/24 |
| 2023/0014944 A1* | 1/2023 | Chaponniere | H04W 36/0066 |
| 2023/0022707 A1* | 1/2023 | Agarwal | H04W 36/00226 |
| 2023/0072061 A1* | 3/2023 | Zheng | H04W 52/0235 |
| 2023/0091383 A1* | 3/2023 | Agarwal | H04W 36/0058 455/436 |
| 2023/0133784 A1* | 5/2023 | Wang | H04W 76/16 455/422.1 |
| 2023/0142156 A1* | 5/2023 | Menon | H04W 88/06 455/435.2 |
| 2023/0164660 A1* | 5/2023 | Chen | H04W 36/0083 370/331 |
| 2023/0199574 A1* | 6/2023 | Marupaduga | H04W 72/044 370/331 |
| 2023/0199911 A1* | 6/2023 | Jung | H04W 76/30 370/329 |
| 2023/0397072 A1* | 12/2023 | Prabhakar | H04L 69/322 |
| 2024/0015584 A1* | 1/2024 | Jeong | H04W 12/041 |
| 2024/0056944 A1* | 2/2024 | Lo | H04L 65/1016 |
| 2024/0080718 A1* | 3/2024 | Wu | H04W 36/0016 |
| 2024/0137179 A1* | 4/2024 | Abebe | H04L 5/0053 |
| 2024/0172074 A1* | 5/2024 | Shi | H04W 36/00226 |

* cited by examiner

OPTIMIZING LAYER ASSIGNMENT BASED ON QCI

SUMMARY

The present disclosure is directed, in part, to dynamically assigning an LTE layer to a UE when the UE falls back from 5G NR to LTE. The determination of the LTE layer is based on applications running on a UE, such as how many applications are running simultaneously. The more applications that are running, and depending on the type of application, the higher the total QCI value will be for that UE. For instance, some applications, such as live streaming, tethering, downloading large files, etc., oftentimes have high QCI values, meaning that a high amount of data is being transferred between the UE and the network. When the total QCI value is above a threshold and a user attempts to initiate or receive a voice call, the network may decide to instruct the UE to fallback (e.g., via EPS) from 5G NR to LTE, and also specifies an LTE layer for the UE. In some instances, the layer with the highest bandwidth is assigned to the UE, allowing the applications to continue running while the UE is in a voice session.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached figures, which are intended to be exemplary and non-limiting, wherein.

DETAILED DESCRIPTION

The subject matter in aspects is provided with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

By way of background, handovers commonly occur in geographic areas where two or more wireless access technologies are available, such as LTE and 5G. For example, when a UE moves to an area where the 5G signal is poor, a coverage-based handover may be needed. In this case, the UE may handover to the LTE network. Handovers may also occur from 5G to LTE when, for example, a UE is receiving or initiating a voice session. VoNR, while up and running for some carriers in some areas, may not operate in some instances. Therefore, when a UE is connected to 5G SA, the network may handover the UE to LTE when the UE initiates or receives a voice call (e.g., QCI=1). Generally, Quality of Service (QOS) Class Identifier (collectively QCI) is a mechanism used in 3GPP LTE networks to ensure carrier traffic is allocated appropriate QoS. Because different carriers require different QoS they also have different QCI values. Examples of QoS parameters include Guaranteed Bit Rate (GBR) or non-GBR, priority handling, packet delay budget, and packet error loss rate. Each service utilized by UEs may have a different QCI, which indicates a certain priority level for traffic on a network. Some services, such as voice calls and IMS signaling, may be associated with QCI values below 6, indicating extra high priority and GBRs. While QCI is used herein to refer to both 4G/LTE and 5G technologies, a 5G QoS Identifier (5QI), is also contemplated in aspects herein. 5G standards termed it 5QI, although the only difference is that 5QI applies to a flow, carried at some point in a bearer, while QCI applies to a bearer within which certain types of flows are expected. 5QI values typically aligned with the EPS (4G) standardized QCI characteristics (e.g., as defined in 3GPP TS 23.203), which makes mapping of QoS easier.

EPS fallback, also referred to herein as EPSFB, is one way that a UE may handover from 5G to LTE. Generally, EPSFB occurs when a UE falls back from 5G to LTE during, for example, call establishment. This may be needed, for example, when not all features for voice over NR (VoNR) are implemented in the UE, or in the case of temporary lack of radio resources in 5G. EPSFB is an additional mobility trigger for improving voice key performance indicators (KPIs). EPSFB enables devices to use the 5G core with NR, but the RAN may trigger moving the device to LTE during call establishment. Reasons for this could include a lack of 5G radio resources, the UE being in an area where 5G is not dimensioned and tuned for voice services, or the UE not having all needed voice features for VoNR.

When EPSFB occurs, the UE is passed from, for example, 5G to LTE. Typically, all UEs are assigned to the same layer, such as layer 1, of LTE without any analysis or dynamic determination as to which layer would be optimal for each UE. As such, even when there is congestion on layer 1, for example, all UEs experiencing EPSFB are still assigned to that layer. Therefore, currently, implementation of EPSFB is to hard-code which LTE layers the UE should fallback to based on pre-configured priorities. But, there is no consideration to prioritize certain LTE layers over others based on a number of applications running on 5G NR prior to fallback. For example, a high utilization NR UE utilizing multiple applications simultaneously (e.g., downloading a large file, live streaming, and tethering) may then either place or receive a voice call. This currently would trigger an EPSFB to an LTE layer. But, if not redirected to the appropriate LTE layer with enough bandwidth, significant user perceived impact is observed for all applications being used by the UE.

In aspects provided herein, in a network scenario of 5G standalone (SA)+LTE+non-VONR+voice EPS FB, aspects are provided to dynamically prioritize a target LTE layer for EPSFB UEs based on applications being used while the UE is on NR. The more applications being used by the UE, the higher the channel bandwidth required to accommodate the applications. In aspects, QCIs and/or applications being used are monitored for UEs. Once either the total QCI or a quantity of applications surpasses a predefined threshold, the UE performs EPSFB and is directed to an LTE layer having the highest bandwidth. In some instances, the QCI and/or applications can act as a trigger for redirecting the UE to the LTE layer having the highest bandwidth, but in other aspects, the trigger may be a voice call being initiated by or received at the UE. Still yet in other aspects, the trigger could be a buffer status report indicating how much data is being used by a particular UE.

A first aspect of the present disclosure is directed to a method for optimizing layer assignment based on a UE QCI. The method comprises, for a first UE of a plurality of UEs, monitoring a total QCI value associated with one or more applications being used by the first UE while the UE is connected to a first node utilizing a first wireless access protocol. Further, the method comprises determining that the total QCI value for the first UE is above a threshold, and based on the total QCI value for the first UE being above the threshold, assigning to the first UE a layer of one or more layers associated with a second node utilizing at least a second wireless access technology.

A second aspect of the present disclosure is directed to a system for optimizing layer assignment based on a UE QCI. The system comprises one or more processors, and one or more computer storage hardware devices storing computer-usable instructions that, when used by the one or more processors, cause the one or more processors to perform steps. These steps include, for a first UE of a plurality of UEs, monitoring a total QCI value associated with one or more applications being used by the first UE while the UE is connected to a first node utilizing a first wireless access protocol, and determining that the total QCI value for the first UE is above a threshold. Further, the steps include, based on the total QCI value for the first UE being above the threshold, assigning to the first UE a layer of one or more layers associated with a second node utilizing at least a second wireless access technology.

According to another aspect of the technology described herein, a method is provided for optimizing layer assignment based on a UE QCI. The method comprises, for a first UE of a plurality of UEs, monitoring a total QCI value associated with one or more applications being used by the first UE while the UE is connected to a first node utilizing a first wireless access protocol, and determining that the total QCI value for the first UE is above a threshold. Further, the method comprises receiving an indication that the first UE is attempting to initiate a voice session or has received a request to join a voice session, and based on the total QCI value for the first UE being above the threshold and the indication that the first UE is attempting to initiate the voice session or has received the request to join the voice session, triggering an EPS fallback procedure for the first UE to move from the first node to a second node that utilizes at least a second wireless access technology. The method also includes assigning to the first UE a layer of one or more layers associated with the second node.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of aspects herein.

Aspects herein may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. Computer-readable media includes media implemented in any way for storing information. Examples of stored information include computer-useable instructions, data structures, program circuitry, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Embodiments may take the form of a hardware embodiment, or an embodiment combining software and hardware. Some embodiments may take the form of a computer-program product that includes computer-useable or computer-executable instructions embodied on one or more computer-readable media.

"Computer-readable media" may be any available media and may include volatile and nonvolatile media, as well as removable and non-removable media. By way of example, and not limitation, computer-readable media may include computer storage media and communication media.

"Computer storage media" may include, without limitation, volatile and nonvolatile media, as well as removable and non-removable media, implemented in any method or technology for storage of information, such as computer-readable instructions, data structures, program circuitry, or other data. In this regard, computer storage media may include, but is not limited to, Random-Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage devices, or any other medium which may be used to store the desired information and which may be accessed by the computing device 700 shown in FIG. 7. Computer storage media does not comprise a signal per se.

"Communication media" may include, without limitation, computer-readable instructions, data structures, program circuitry, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

A "network" refers to a network comprised of wireless and wired components that provide wireless communications service coverage to one or more user equipment (UE). The network may comprise one or more base stations, one or more cell sites (i.e., managed by a base station), one or more cell towers (e.g., having an antenna) associated with each base station or cell site, a gateway, a backhaul server that connects two or more base stations, a database, a power supply, sensors, and other components not discussed herein, in various embodiments.

The terms "base station" and "cell site" may be used interchangeably herein to refer to a defined wireless communications coverage area (e.g., a geographic area) serviced by a base station. It will be understood that one base station may control one cell site or alternatively, one base station may control multiple cell sites. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connected to a network.

An "access point" may refer to hardware, software, devices, or other components at a base station, cell site, and/or cell tower having an antenna, an antenna array, a radio, a transceiver, and/or a controller. Generally, an access point may communicate directly with user equipment according to one or more access technologies (e.g., 3G, 4G, LTE, 5G, mMIMO (massive multiple-input/multiple-output)) as discussed herein.

The terms "user equipment," "UE," and/or "user device" are used interchangeably to refer to a device employed by an end-user that communicates using a network. UE generally includes one or more antenna coupled to a radio for exchanging (e.g., transmitting and receiving) transmissions with a nearby base station, via an antenna array of the base station. In embodiments, UE may take on any variety of devices, such as a personal computer, a laptop computer, a tablet, a netbook, a mobile phone, a smart phone, a personal digital assistant, a wearable device, a fitness tracker, or any other device capable of communicating using one or more resources of the network. UE may include components such as software and hardware, a processor, a memory, a display component, a power supply or power source, a speaker, a touch-input component, a keyboard, and the like. In embodiments, some of the UE discussed herein may include current UE capable of using 5G and having backward compatibility with prior access technologies (e.g., Long-Term Evolution (LTE)), current UE capable of using 5G and lacking backward compatibility with prior access technologies, and legacy UE that is not capable of using 5G.

Additionally, it will be understood that terms such as "first," "second," and "third" are used herein for the purposes of clarity in distinguishing between elements or features, but the terms are not used herein to import, imply, or otherwise limit the relevance, importance, quantity, technological functions, sequence, order, and/or operations of any element or feature unless specifically and explicitly stated as such. Along similar lines, certain UE are described herein as being "priority" UE and non-priority UE, but it should be understood that in certain implementations UE may be distinguished from other UEs based on any other different or additional features or categorizations (e.g., computing capabilities, subscription type, and the like).

The terms "servicing" and "providing signal coverage," "providing network coverage," and "providing coverage," are interchangeably used to mean any (e.g., telecommunications) service(s) being provided to user devices. Moreover, "signal strength"; "radio conditions," "level of coverage," and like, are interchangeably used herein to refer to a connection strength associated with a user device. For example, these terms may refer to radio conditions between a user device and a beam providing coverage to the user device. In particular, the "signal strength," "level of coverage," and like may be expressed in terms of synchronization signal (SS) measurements/values and/or channel state information (CSI) measurements/values. In the context of 5G, signal strength may be measured by user devices, which may communicate the signal strength to the cell site and/or the beam management system disclosed herein. In particular, a user device may report various measurements. For example, a user device may provide signal strength as certain synchronization signal (SS) measurements, such as a SS reference signal received power (SS-RSRP) value/measurement, a SS Reference Signal Received Quality (SS-RSRQ) value/measurement, a SS signal-to-noise and interference ratio (SS-SINR) value/measurement, and/or the like. Alternatively or additionally, in some embodiments, signal strength may also be measured and provided in terms of channel state information (CSI) values.

Figure 1:
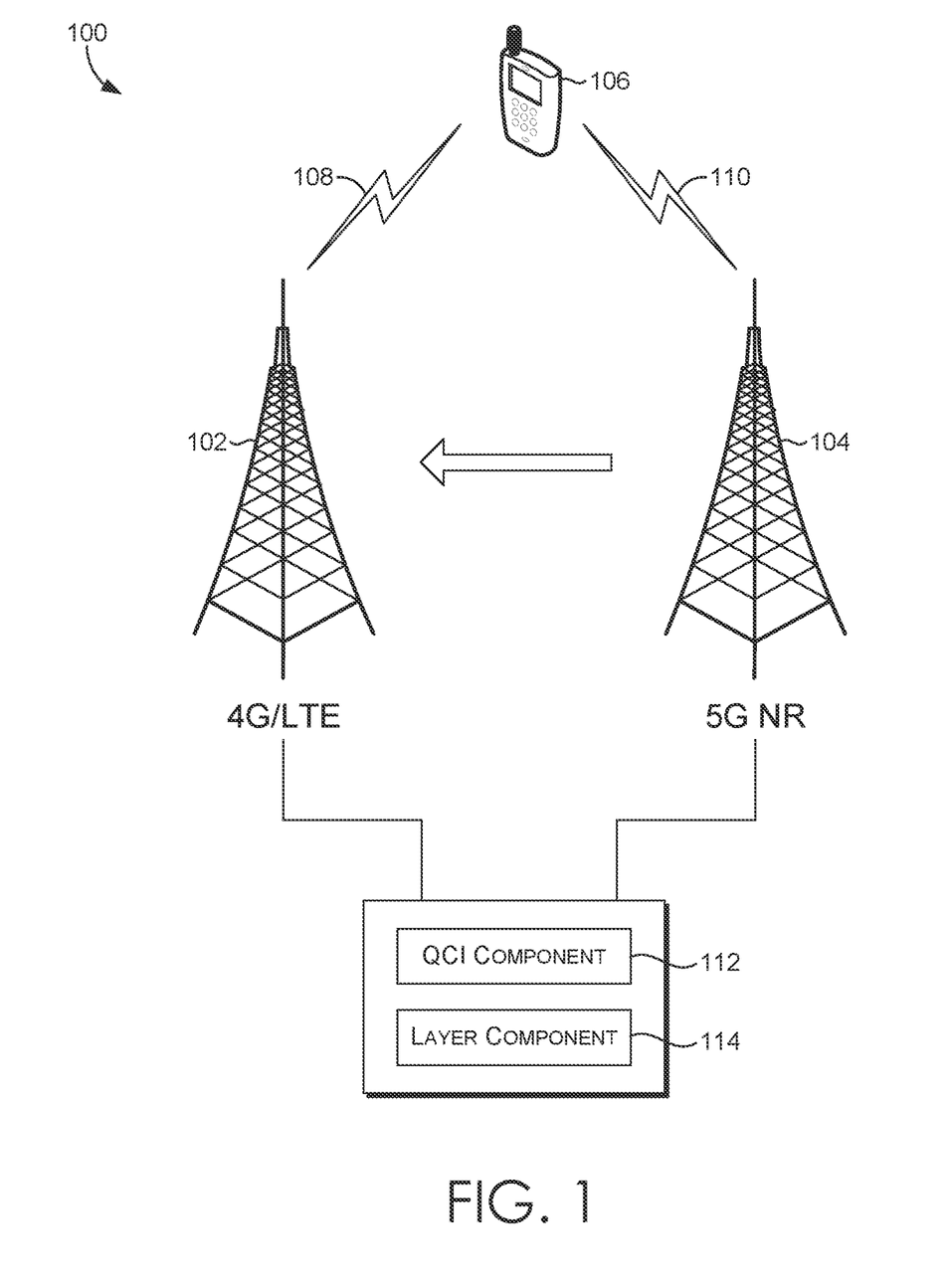
FIG. 1 depicts a diagram of an exemplary computing environment suitable for use in implementations of the present disclosure.

Turning now to FIG. 1, FIG. 1 depicts a diagram of an exemplary network environment 100 suitable for use in implementations of the present disclosure. Such a network environment is illustrated and designated generally as network environment 100. Network environment 100 is but one example of a suitable network environment and is not intended to suggest any limitation as to the scope of use or functionality of the invention. Neither should the network environment be interpreted as having any dependency or requirement relating to any one or combination of components illustrated.

Network environment 100 provides service to one or more user devices, such as exemplary UE 106. In some embodiments, the network environment 100 may be a telecommunication network (e.g., a telecommunication network such as, but not limited to, a wireless telecommunication network), or portion thereof. The network environment 100 may include one or more devices and components, such as base stations, servers, switches, relays, amplifiers, databases, nodes, etc. which are not shown so as to not confuse other aspects of the present disclosure. (Example components and devices are discussed below with respect to FIG. 5.) Those devices and components may provide connectivity in a variety of implementations. In addition, the network environment 100 may be utilized in a variety of manners, such as a single network, multiple networks, or as a network of networks, but, ultimately, is shown as simplified as possible to avoid the risk of confusing other aspects of the present disclosure.

The network environment 100 may include or otherwise may be accessible through nodes 102 and 104. Nodes 102 and 104 may include one or more antennas, base transmitter stations, radios, transmitter/receivers, digital signal processors, control electronics, GPS equipment, power cabinets or power supply, base stations, charging stations, and the like. In this manner, nodes 102 and 104 may provide a communication link between UE 106 and any other components, systems, equipment, and/or devices of the network environment 100 (e.g., the beam management system). The base station and/or a computing device (e.g., whether local or remote) associated with the base station may manage or otherwise control the operations of components of nodes 102 and 104. Example components that may control the operations of components of nodes 102 and 104 are discussed below with respect to FIG. 5.

Nodes 102 and 104 may include a gNodeB, eNodeB, or any other suitable node structured to communicatively couple to the UE 106 by way of communication links 108 and 110. Nodes 102 and 104 may correspond to one or more frequency bands. A frequency is the number of times per second that a radio wave completes a cycle. The frequency band may include a frequency range (e.g., a lower frequency and an upper frequency) within which the user device(s)

may connect to the network environment such as, but not limited to, a telecommunication network or a portion thereof. The frequency range may be measured by the wavelength in the range or any other suitable wave properties.

In some embodiments, the UE 106 may take the form of a wireless or mobile device capable of communication via the network environment 100. For example, the UE 106 may take the form of a mobile device capable of communication via a telecommunication network such as, but not limited to, a wireless telecommunication network. In this regard, the UE 106 may be any mobile computing device that communicates by way of a network, for example, a 3G, CDMA, 4G, LTE, WiMAX, 5G, 6G or any other type of network. The network environment 100 may include any communication network providing voice and/or data service(s), such as, for example, a 1× circuit voice, a 3G network (e.g., Code Division Multiple Access (CDMA), CDMA 2000, WCDMA, Global System for Mobiles (GSM), Universal Mobile Telecommunications System (UMTS), a 4G network (LTE, Worldwide Interoperability for Microwave Access (WiMAX), High-Speed Downlink Packet Access (HSDPA)), a 5G network, or a 6G network.

In addition to UE 106 and nodes 102 and 104, network environment 100 includes communications links 108 and 110, QCI component 112, and layer component 114. In network environment 100, UE 106 may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 500) that communicates via wireless communications with nodes 102 and 104 in order to interact with a public or private network.

In some implementations, nodes 102 and 104 are configured to communicate with user devices, such as UE 106 and other devices that are located within the geographical area, or cell, covered by the one or more antennas of nodes 102 and 104. Nodes 102 and 104 may include one or more base stations, nodes, base transmitter stations, radios, antennas, antenna arrays, power amplifiers, transmitters/receivers, digital signal processors, control electronics, GPS equipment, and the like. In one aspect, node 102 is an eNodeB, while node 104 is a gNodeB. In particular, UE 106 may communicate with nodes 102 and 104 according to any of one or more communication protocols (e.g., 4G/LTE, 5G NR) in order to access the network.

In aspects, UE 106 may be in communication with node 104, which is a 5G SA system, meaning that it provides 5G connectivity to UE 106 without the use of LTE, or node 102 as shown in FIG. 1. QCI component 112 is generally responsible for monitoring applications running on a particular UE, such as UE 106. For example, QCI component 112 may simply monitor a quantity of applications running on a UE, or may monitor a total QCI based on the type of applications running on the UE. The QCI component 112 may also be responsible for reviewing a buffer status report, should that be the trigger for moving the UE 106 to a high bandwidth layer of LTE. In aspects, the QCI component 112 may determine when the QCI, number of applications, or buffer status report meet a threshold indicating that the UE 106 should fallback to LTE. The layer component 114 may then determine onto which layer UE 106 should fallback. In aspects, the layer selected for UE 106 is the layer with the highest bandwidth to support all of the applications being used by UE 106.

In one example, UE 106 may be live streaming, downloading a movie, and acting as a hotspot for one or more other devices. In this instance, the QCI component 112 may determine that the total QCI for the UE 106 at that moment may exceed an operator-defined threshold. The layer component 114 then determines that UE 106 is to fallback to layer 1, for example, having the highest bandwidth to support all of the applications being used by UE 106. In another example, UE 106 may be live streaming, downloading a movie, and acting as a hotspot for one or more other devices, but also may be initiating or receiving a voice call. In this instance, UE 106 would also be instructed to fallback to LTE, and would be assigned a layer that could handle the high amounts of data transfer. The assumptions in providing the above examples are that the target LTE layers have enough capacity for UE 106 and are not already overloaded. Also, it is assumed that there is overlapping 5G SA and LTE coverage. In addition to the assumptions, some UEs may have guaranteed bit rates (GBR) that need to be met by the carrier. This may be yet another reason UE 106 would need to fallback to LTE when a voice call is made or received. When EPSFB does occur, UE 106 may move from communicating with node 104 to communicating with node 102, where it will then be assigned to an LTE layer by layer component 114.

Having described the network environment 100 and components operating therein, it will be understood by a person having ordinary skill in the art that the network environment 100 is but one example of a suitable network and is not intended to limit the scope of use or functionality of aspects described herein. Similarly, the network environment 100 should not be interpreted as imputing any dependency and/or any requirements with regard to each component and combination(s) of components illustrated in FIG. 1. It will be appreciated by a person having ordinary skill in the art that the number, interactions, and physical location of components illustrated in FIG. 1 are examples, as other methods, hardware, software, components, and devices for establishing one or more communication links between the various components may be utilized in implementations of the present disclosure. It will be understood to a person having ordinary skill in the art that the components may be connected in various manners, hardwired or wireless, and may use intermediary components that have been omitted or not included in FIG. 1 for simplicity's sake. As such, the absence of components from FIG. 1 should not be interpreted as limiting the present invention to exclude additional components and combination(s) of components. Moreover, though components may be represented as singular components or may be represented in a particular quantity in FIG. 1, it will be appreciated that some aspects may include a plurality of devices and/or components such that FIG. 1 should not be considered as limiting the quantity of any device and/or component.

Figure 2:
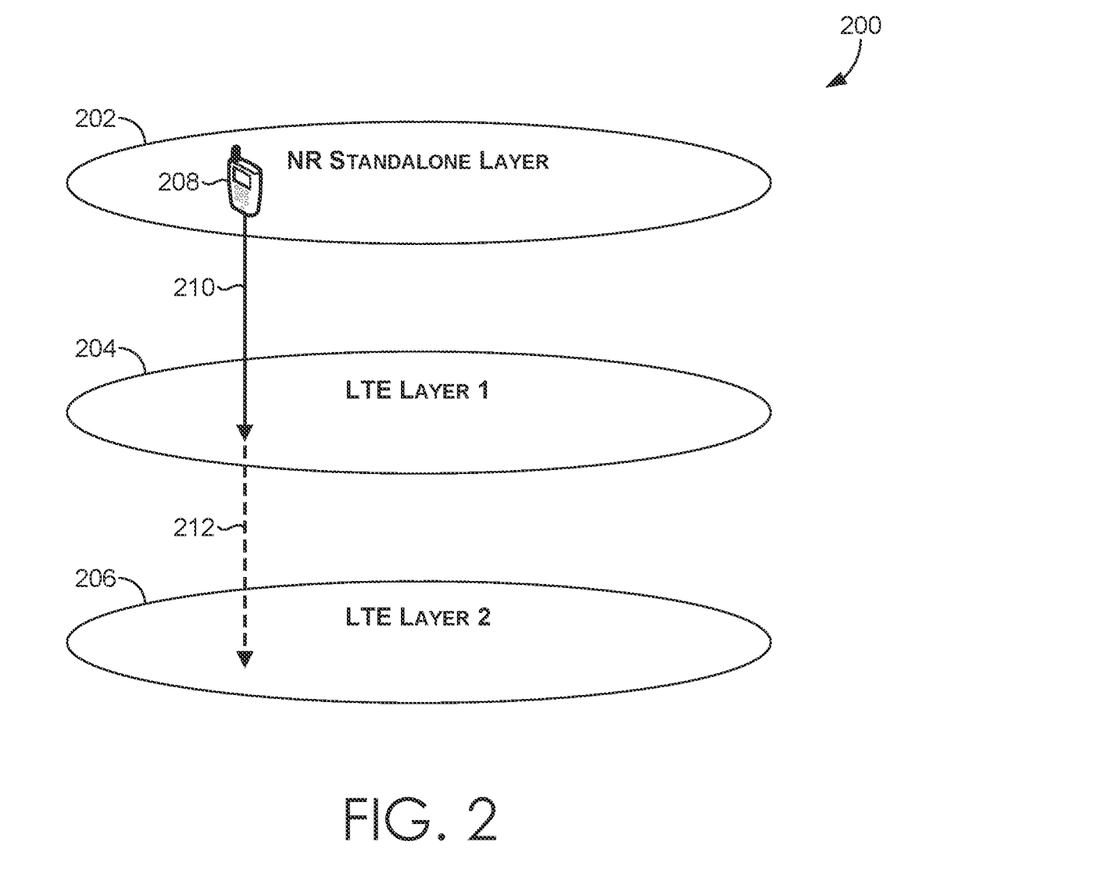
FIG. 2 depicts a diagram illustrating layer assignment during EPS fallback, according to various aspects herein.

FIG. 2 illustrates a diagram 200 of EPSFB from an NR standalone layer 202 to LTE layer 1 204 or LTE layer 2 206. As described with respect to FIG. 1, a UE, such as UE1 208 as shown here may have a total QCI above a predetermined threshold, and in addition may have received or is attempting to initiate a voice session. When this is determined, UE 208 may fallback (e.g., via EPS) from NR standalone layer 202 to LTE layer 1 204 or LTE layer 2 206. The network, given that the total QCI for UE 208 is above a threshold, may determine that UE 208 should fallback to LTE layer 1

204 give that here, LTE layer 1 204 operates at a higher bandwidth than LTE layer 2 206. Given that UE 208 requires a high amount of data transfer for the applications being run on UE 208, the LTE layer having the highest bandwidth is assigned to UE 208 to allow for a better end user experience so that a voice call can be made or received, but the applications can continue to run on UE 208.

Figure 3:
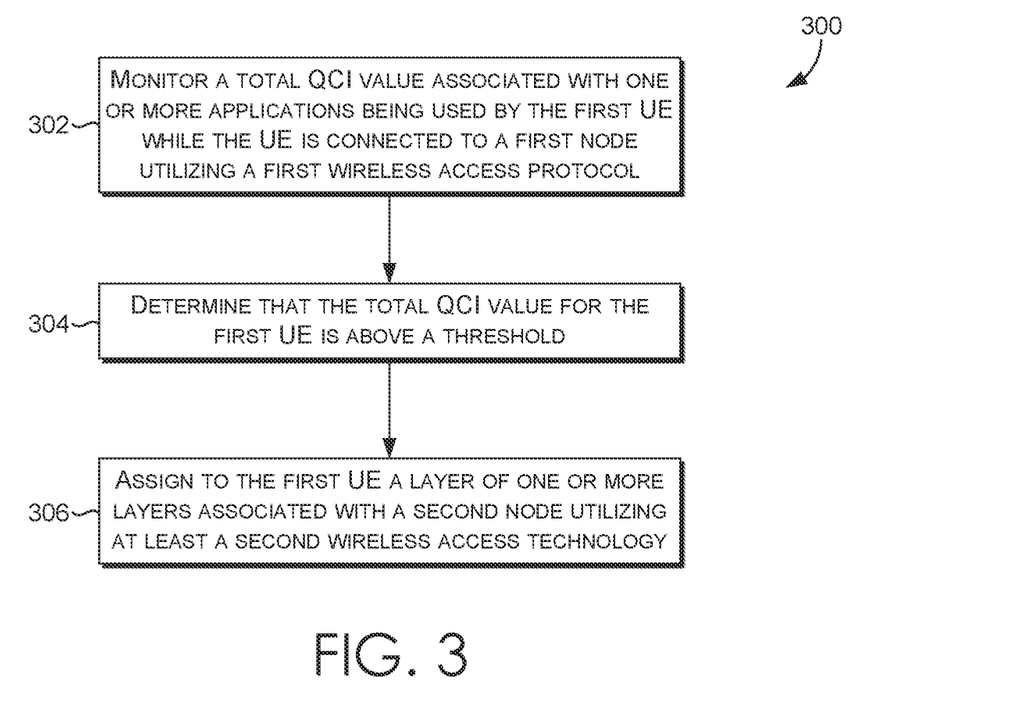
FIG. 3 depicts a flow diagram of an exemplary method for optimizing layer assignment based on a UE QCI, in accordance with aspects herein.

Turning now to FIG. 3, a flowchart is provided of a method 300 for optimizing layer assignment based on a UE QCI. Initially at block 302, a total QCI value is monitored, where the QCI value is associated with one or more applications being used by a first UE while the UE is connected to a first node utilizing a first wireless access protocol (e.g., 5G NR). At block 304, it is determined that the total QCI value for the first UE is above a threshold. In addition to this, the first UE may be attempting to initiate or may be receiving a voice call. This, alone or in addition to the total QCI value being above a threshold, may trigger fallback to LTE. At block 306, based on the total QCI value for the first UE being above the threshold, a layer of one or more layers is assigned to the first UE, where the one or more layers are associated with a second node utilizing at least a second wireless access technology (e.g., LTE/4G). In aspects, the first UE may fallback from the first node to the second node via EPS, where the first node may support 5G NR only, and the second node may support at least LTE/4G. Each of the layers of the one or more layers may operate in a different frequency band. In some aspects, the first UE may be assigned to the layer having the highest frequency band.

In some aspects, one or more of the UEs may already be on LTE, but the network may assign that UE a different layer (e.g., from layer 1 to layer 2) so that the UE's layer is optimized. As such, if a UE is on layer 1, but it is determined that the total QCI value for that UE is above a threshold, the network may assign the UE a different layer with a higher bandwidth. Other aspects contemplate that a UE is on a 5G standalone network, and is going to experience EPSFB based on one or more of many factors. Here, the UE would be falling back from 5G SA to LTE. But, instead of blindly assigning the UE an LTE layer, or assigning all UEs to the same layer, aspects herein provide for an intelligent layer assignment for the UE based on a total QCI value or a quantity of applications running on the UE. As described herein, each LTE layer may operate in a different bandwidth or a different frequency. As mentioned, in some aspects, the layer having the highest bandwidth may be assigned to the UE because of the UE's total QCI value being above a threshold. But, in other aspects, some UEs may not have the capability to operate at a first bandwidth, but can operate at a second bandwidth, and thus would be assigned to a layer that is compatible with the UE.

Figure 4:
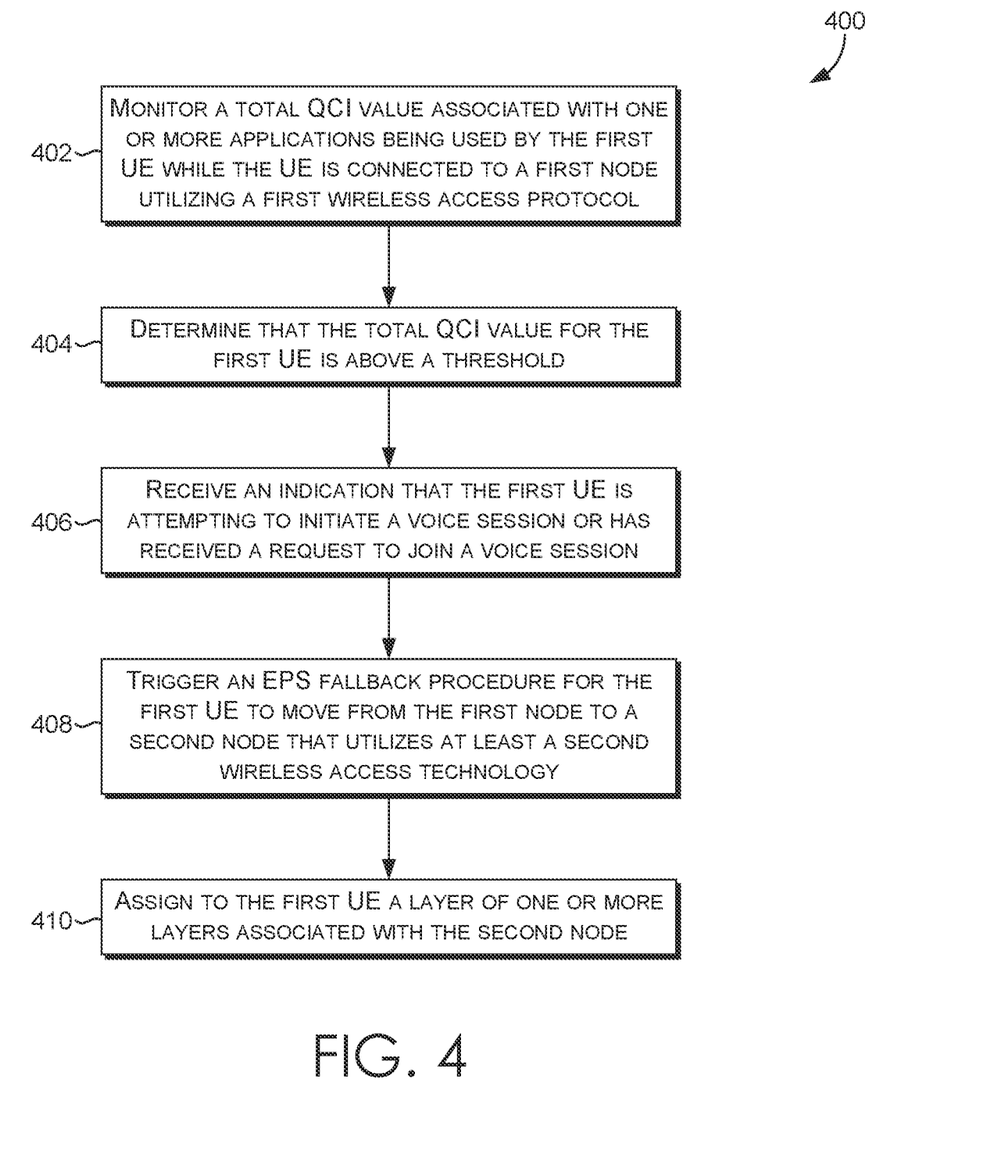
FIG. 4 depicts a flow diagram of an exemplary method for optimizing layer assignment based on a UE QCI, in accordance with aspects herein.

Turning now to FIG. 4, a flowchart is provided of a method 400 for optimizing layer assignment based on UE QCI. At block 402, a total QCI value for a UE is monitored, where the total QCI value is associated with one or more applications being used by the first UE while the UE is connected to a first node utilizing a first wireless access protocol. At block 404, it is determined that the total QCI value is above a threshold. At block 406, an indication is received that the first UE is attempting to initiate a voice session or has received a request to join a voice session. At block 408, based on the total QCI value being above the threshold and receiving the indication that the first UE is attempting to initiate or receiving a request for a voice session, an EPS fallback procedure is triggered for the first UE to fallback from the first node to the second node that utilizes at least a second wireless access technology. At block 410, a layer is assigned to the first UE, the layer being associated with the second node.

Figure 5:
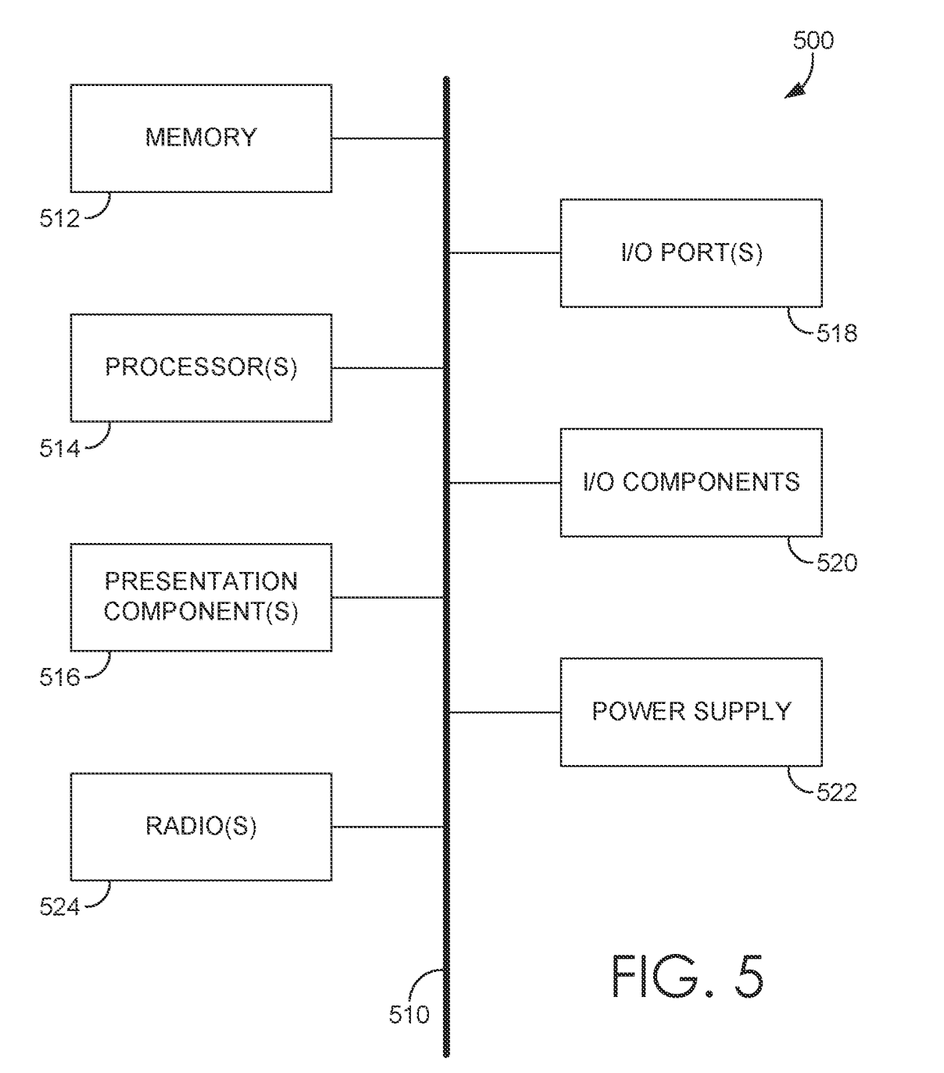
FIG. 5 depicts an exemplary computing environment suitable for use in implementations of the present disclosure.

Referring to FIG. 5, a diagram is depicted of an exemplary computing environment suitable for use in implementations of the present disclosure. In particular, the exemplary computer environment is shown and designated generally as computing device 500. Computing device 500 is but one example of a suitable computing environment and is not intended to suggest any limitation as to the scope of use or functionality of the invention. Neither should computing device 500 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 5, computing device 500 includes bus 502 that directly or indirectly couples the following devices: memory 504, one or more processors 506, one or more presentation components 508, input/output (I/O) ports 510, I/O components 512, power supply 514, and radio 516. Bus 502 represents what may be one or more busses (such as an address bus, data bus, or combination thereof). Although the devices of FIG. 5 are shown with lines for the sake of clarity, in reality, delineating various components is not so clear, and metaphorically, the lines would more accurately be grey and fuzzy. For example, one may consider a presentation component such as a display device to be one of I/O components 512. Also, processors, such as one or more processors 506, have memory. The present disclosure hereof recognizes that such is the nature of the art, and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 5 and refer to "computer" or "computing device."

Computing device 500 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 504 includes computer-storage media in the form of volatile and/or nonvolatile memory. Memory 504 may be removable, nonremovable, or a combination thereof. Exemplary memory includes solid-state memory, hard drives, optical-disc drives, etc. Computing device 500 includes one or more processors 506 that read data from various entities such as bus 502, memory 504 or I/O components 512. One or more presentation components 8708 presents data indications to a person or other device. Exemplary one or more presentation components 508 include a display device, speaker, printing component, vibrating component, etc. I/O ports 510 allow computing device 500 to be logically coupled to other devices including I/O components 512, some of which may be built in computing device 500. Illustrative I/O components 512 include a microphone, joystick, game pad, satellite dish, scanner, printer, wireless device, etc.

Radio 516 represents a radio that facilitates communication with a wireless telecommunications network. Illustrative wireless telecommunications technologies include CDMA, GPRS, TDMA, GSM, and the like. Radio 516 might additionally or alternatively facilitate other types of wireless communications including Wi-Fi, WiMAX, LTE, or other VoIP communications. As can be appreciated, in various embodiments, radio 516 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A method for optimizing layer assignment based on a user equipment (UE) quality control indicator (QCI), the method comprising:
    for a first UE of a plurality of UEs, monitoring a total QCI value associated with one or more applications being used by the first UE while the first UE is connected to a first node utilizing a first wireless access protocol;
    determining that the total QCI value for the first UE is above a threshold;
    determining that the first UE has experienced an evolved packet system (EPS) fallback procedure from the first wireless access protocol to a second wireless access protocol; and
    assigning to the first UE a layer of one or more layers associated with a second node utilizing at least the second wireless access protocol, wherein the first UE is assigned to the layer based on the total QCI value for the first UE being above the threshold.

2. The method of claim 1, wherein the each layer of the one or more layers operates in a different frequency band.

3. The method of claim 1, further comprising receiving an indication that the first UE is attempting to initiate a voice session.

4. The method of claim 1, further comprising receiving an indication that the first UE has received a request to join a voice session.

5. The method of claim 1, wherein the assigning to the first UE the layer of the one or more layers associated with the second node utilizing at least the second wireless access technology is further based on the first UE attempting to initiate a voice session or the first UE receiving an invitation to join a voice session.

6. The method of claim 1, wherein the one or more layers comprise at least two layers.

7. The method of claim 1, wherein the total QCI value corresponds to one or more of a quantity of applications or a type of application being utilized by the first UE.

8. The method of claim 1, further comprising determining that the first UE of the plurality of UEs has a capability of utilizing a first layer of the one or more layers but not a second layer of the one or more layers.

9. The method of claim 1, further comprising analyzing a buffer status report associated with the first UE.

10. The method of claim 1, wherein the layer assigned to the first UE is the layer with the highest bandwidth of the one or more layers.

11. A system for optimizing layer assignment based on a user equipment (UE) quality control indicator (QCI), the system comprising:
    one or more processors; and
    one or more computer storage hardware devices storing computer-usable instructions that, when used by the one or more processors, cause the one or more processors to:
        for a first UE of a plurality of UEs, monitor a total QCI value associated with one or more applications being used by the first UE while the first UE is connected to a first node utilizing a first wireless access protocol;

determine that the total QCI value for the first UE is above a threshold;

determine that the UE has experienced an evolved packet system (EPS) fallback procedure from the first wireless access protocol to a second wireless access protocol; and subsequent to the UE experiencing the EPS fallback procedure, assign to the first UE a layer of one or more layers associated with a second node utilizing at least the second wireless access protocol, wherein the first UE is assigned to the layer based on the total QCI value for the first UE being above the threshold.

12. The system of claim 11, wherein the each layer of the one or more layers operates in a different frequency band.

13. The system of claim 11, wherein the layer assigned to the first UE is the layer, with the highest bandwidth of the one or more layers.

14. The system of claim 11, further comprising analyzing a buffer status report associated with the first UE.

15. A method for optimizing layer assignment based on a user equipment (UE) quality control indicator (QCI), the method comprising:

for a first UE of a plurality of UEs, monitoring a total QCI value associated with one or more applications being used by the first UE while the first UE is connected to a first node utilizing a first wireless access protocol;

determining that the total QCI value for the first UE is above a threshold;

receiving an indication that the first UE is attempting to initiate a voice session or has received a request to join a voice session;

based on the indication that the first UE is attempting to initiate the voice session or has received the request to join the voice session, triggering an evolved packet system (EPS) fallback procedure for the first UE to move from the first node to a second node that utilizes at least a second wireless access protocol; and assigning to the first UE a layer of one or more layers associated with the second node, wherein the first UE is assigned to the layer based on the total QCI value for the first UE being above the threshold.

16. The method of claim 15, wherein the each layer of the one or more layers operates in a different frequency band.

17. The method of claim 15, further comprising analyzing a buffer status report associated with the first UE.

18. The method of claim 15, wherein the layer assigned to the first UE is the layer with the highest bandwidth of the one or more layers.

* * * * *